(12) United States Patent
Chou

(10) Patent No.: US 8,790,113 B2
(45) Date of Patent: Jul. 29, 2014

(54) MOLD WITH HIGH EXHAUST EFFICIENCY

(71) Applicant: Yun-Yu Chou, New Taipei (TW)

(72) Inventor: Yun-Yu Chou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 65 days.

(21) Appl. No.: 13/629,976

(22) Filed: Sep. 28, 2012

(65) Prior Publication Data

US 2013/0142901 A1 Jun. 6, 2013

(30) Foreign Application Priority Data

Dec. 6, 2011 (TW) .............................. 100144942 A

(51) Int. Cl.
*B29C 45/63* (2006.01)

(52) U.S. Cl.
USPC ............................ 425/546; 264/102; 425/812

(58) Field of Classification Search
USPC .................... 425/546, 812; 264/102
See application file for complete search history.

(56) References Cited

U.S. PATENT DOCUMENTS

| | | | | |
|---|---|---|---|---|
| 7,625,199 B2 * | 12/2009 | Jahn et al. | ...................... | 425/190 |
| 7,956,471 B2 * | 6/2011 | Eu et al. | ........................ | 257/774 |
| 8,083,516 B2 * | 12/2011 | Guo | .............................. | 425/572 |

* cited by examiner

*Primary Examiner* — Tim Heitbrink
(74) *Attorney, Agent, or Firm* — Novak Druce Connolly Bove + Quigg LLP

(57) ABSTRACT

A mold includes a first core and a second core matched with the first core. The first core includes a first die parting surface defining the molding cavity. The second core includes a second die parting surface facing the first die parting surface. A plurality of first exhaust grooves are defined in the first die parting surface. A plurality of transverse second exhaust grooves are defined in the second die parting surface. When the mold is closed, the first core and the second core cooperatively form at least one molding space. The first exhaust grooves are machining marks formed during the machining of the first core. The second exhaust grooves are machining marks formed during the machining of the second core.

20 Claims, 2 Drawing Sheets

MOLD WITH HIGH EXHAUST EFFICIENCY

BACKGROUND

1. Technical Field

The present disclosure generally relates to molds, and particularly to a mold with better efficiency in preventing or removing gas pockets.

2. Description of Related Art

The ability of a mold to exhaust gas (exhaust efficiency) is an important consideration in mold design. Especially, when molding products with thin walls, the exhaust efficiency of the mold is relatively low, because the die cavity is small and the mold must have the ability to withstand a higher mold locking force for injection of materials at higher speed. Typically a plurality of exhaust grooves is defined in the slide blocks of the mold. A vacuum pump is connected with the exhaust grooves to improve the exhaust efficiency of gas. However, the exhaust efficiency is limited by the vacuum pump, and burrs and fringes on the molding products are easily formed due to the presence of the exhaust grooves.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
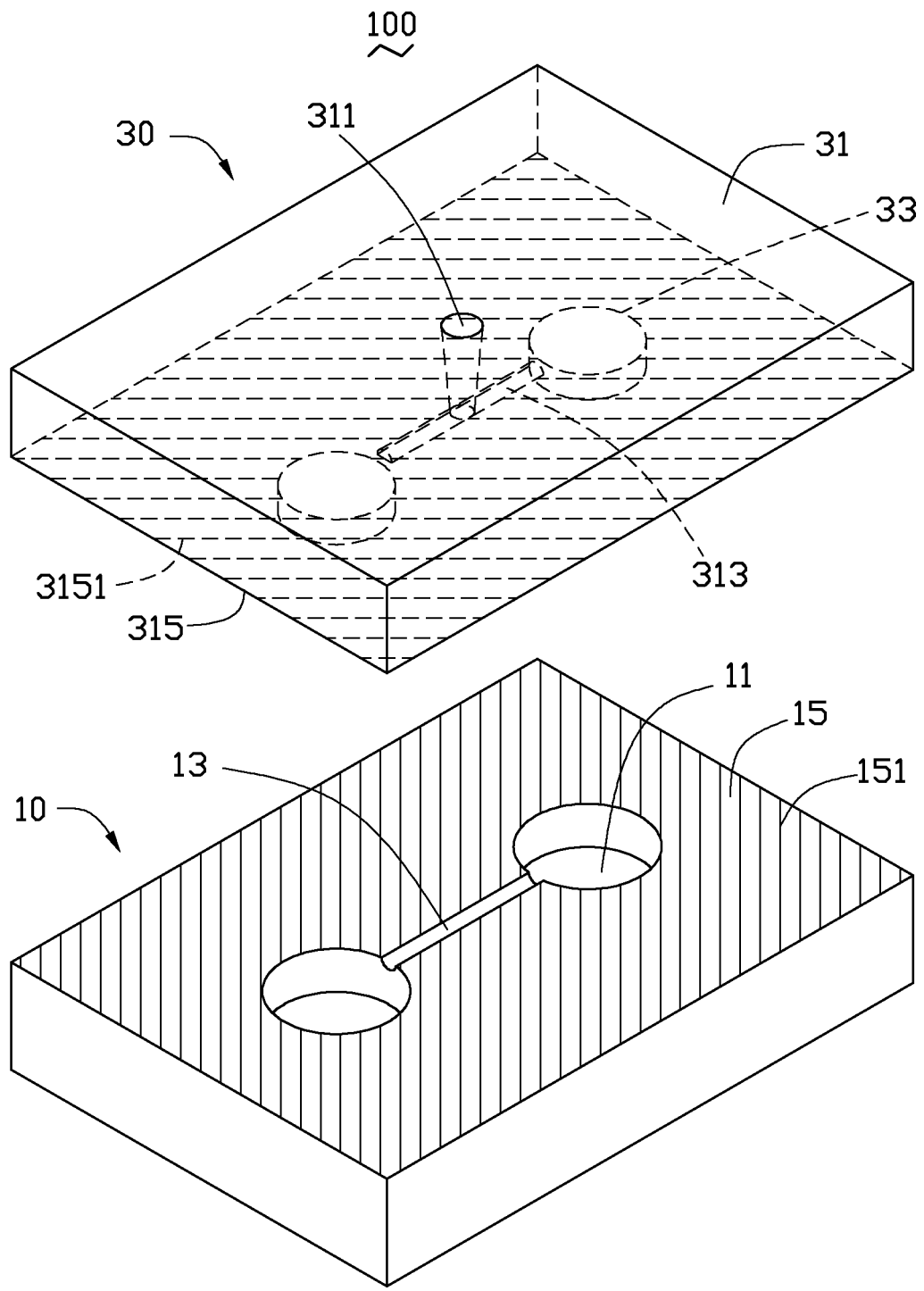
FIG. 1 shows an isometric view of a mold of one embodiment.

Referring to FIG. 1, one embodiment of a mold 100 for injection molding is shown. The mold 100 includes a first core 10 and a second core 30 matched with the first core 10. The mold 100 further includes other various functional mechanisms, such as a securing mechanism, a heating mechanism, a cooling mechanism, and an ejection mechanism. For simplicity, only the first core 10 and the second 30 are described herein in the embodiment.

Figure 2:
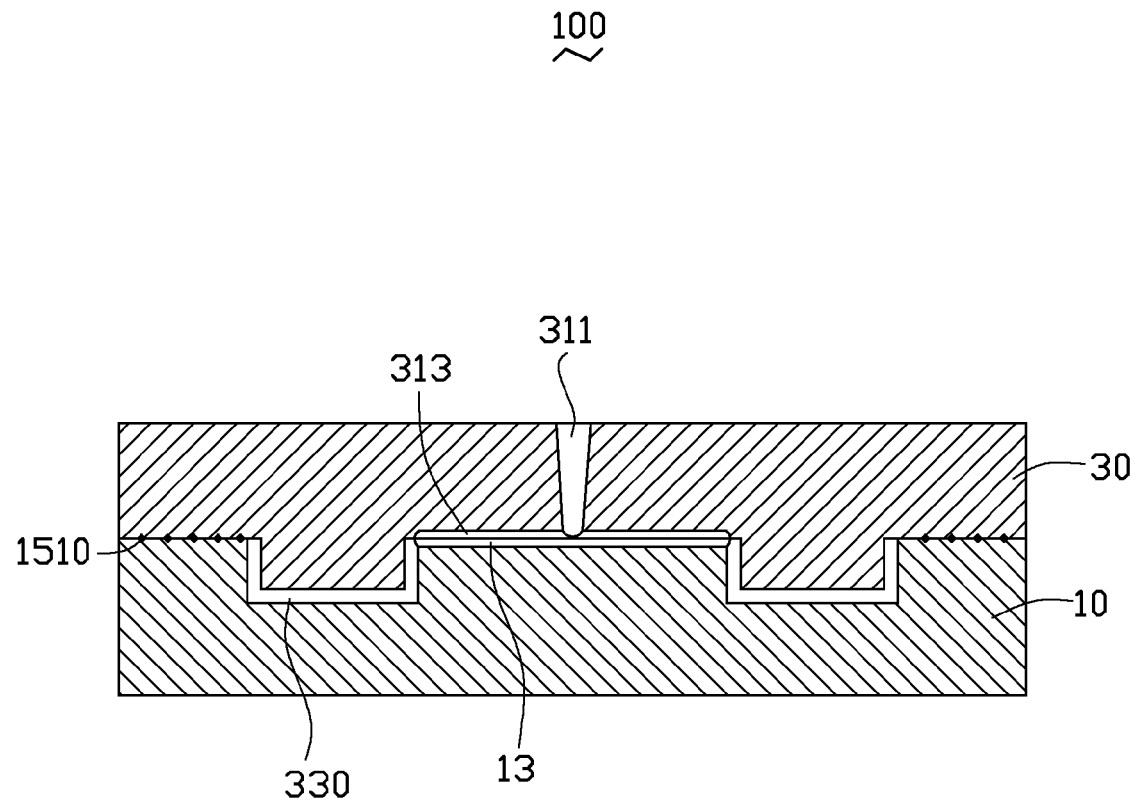
FIG. 2 shows a cross-sectional view of the mold of FIG. 1 in a closed state.

Referring to FIG. 2, the first core 10 includes a first die parting surface 15. Two molding cavities 11 are defined symmetrically about a center of the first die parting surface 15. A sub-channel 13 is further defined in the first die parting surface 15, between, and communicating with, the two molding cavities 11. A plurality of first exhaust grooves 151 is defined in the first die parting surface 15. The first exhaust grooves 151 are linear and parallel to each other. The first exhaust grooves 151 are evenly distributed over the whole of the first die parting surface 15.

In the illustrated embodiment, a cross-section across each first exhaust groove 151 is triangular in shape. A depth of each first exhaust groove 151 across the triangular cross-section thereof is in a range from about 1 micrometer (μm) to about 5 μm. A width of each first exhaust groove 151 across the base of the triangular cross-section thereof is also in a range from about 1 μm to about 5 μm. The first exhaust grooves 151 are machining marks formed during the machining of the first core 10. A shape and size of each first exhaust groove 151 can be changed as a function of the machining processes.

The second core 30 includes a body 31 and two protrusion portions 33 formed on the body 31. The body 31 includes a second die parting surface 315 facing the first die parting surface 15 of the first core 10. A channel 311 and a sub-channel 313 are defined in the second die parting surface 315. The channel 311 is defined in a center of second die parting surface 315. The sub-channel 313 is defined between the protrusion portions 33 and communicates with the channel 311, and corresponds to the sub-channel 13 of the first core 10. The two protrusion portions 33 correspond to the two molding cavities 11 of the first core 10, such that the second core 30 and the first core 10 cooperatively form two molding spaces 330 when the mold 100 is closed. A plurality of second exhaust grooves 3151 is defined in the second die parting surface 315. The second exhaust grooves 3151 are linear and parallel to each other. The second exhaust grooves 3151 are evenly distributed over the whole of the second die parting surface 315. An extension direction of the second exhaust grooves 3151 intersects with an extension direction of the first exhaust grooves 151. An intersection angle formed between the second exhaust grooves 3151 and the first exhaust grooves 151 is greater than 0 degree, such as 30 degrees, 45 degrees, or 90 degrees.

In the illustrated embodiment, a cross-section across each second exhaust groove 3151 is triangular in shape. A depth of each second exhaust groove 3151 across the triangular cross-section thereof is in a range from about 1 μm to about 5 μm. A width of each second exhaust groove 3151 across the base of the triangular cross-section thereof is in a range from about 1 μm to about 5 μm. The second exhaust grooves 3151 are machining marks formed during machining of the second core 30. If the intersection angle formed between the second exhaust grooves 3151 and the first exhaust grooves 151 is 90 degrees, the machining of the first core 10 and the second core 30 becomes relatively easy. A shape and size of each second exhaust groove 3151 can be changed as a function of the machining processes.

In an alternative embodiment, the number of the molding cavities 11 can be changed as needed, and the number of protrusion portions 33 will change accordingly. The protrusion portion 33 can be omitted.

When performing injection molding, the first exhaust grooves 151 communicate with the second exhaust grooves 3151 in a criss-cross pattern, forming a plurality of gas vents 1510 communicating with each other, and the gas vents 1510 communicate with the molding spaces 330. Because the size of each gas vent 1510 is relatively small, combining with the fact that the quantity of the gas vents 1510 is relatively great, thus the gases trapped in the molding spaces 330 are exhausted gently and efficiently. Thus, the incidence or occurrence of burrs and fringes on the molded products caused by the gas exhausting will be reduced. The first exhaust grooves 151 and the second exhaust grooves 3151 are formed by machining the first core 10 and the second core 30, so that additional costs of machining the exhaust grooves can be omitted, and the cost of the mold 100 is relatively low.

It is to be understood, however, that even through numerous characteristics and advantages of the disclosure have been set forth in the foregoing description, together with details of the structure and function of the present disclosure, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A mold, comprising:
a first core comprising a first die parting surface defining a molding cavity; and a second core matched with the first core and comprising a second die parting surface facing the first die parting surface of the first core;

wherein when the mold is closed, the first core and the second core cooperatively form at least one molding space, a plurality of first exhaust grooves is defined in the first die parting surface, a plurality of second exhaust grooves is defined in the second die parting surface, an extension direction of the second exhaust grooves intersects with an extension direction of the first exhaust grooves to form a plurality of gas vents communicating with each other when molding, a part of the gas vents are communicated with the at least one molding space, the first exhaust grooves are machining marks formed during the machining of the first core, and the second exhaust grooves are machining marks formed during the machining of the second core.

2. The mold of claim 1, wherein a cross section across each first exhaust groove is triangular.

3. The mold of claim 2, wherein a width across a base of the cross-section of each first exhaust groove is in a range from about 1 micrometer to about 5 micrometers, and a depth of each first exhaust groove across the cross-section thereof is in a range from about 1 micrometer to about 5 micrometers.

4. The mold of claim 1, wherein a cross-section across each second exhaust groove is triangular.

5. The mold of claim 4, wherein a width across a base of the cross-section of each second exhaust groove is in a range from about 1 micrometer to about 5 micrometers, and a depth of each second exhaust groove across the cross section thereof is in a range from about 1 micrometer to about 5 micrometers.

6. The mold of claim 1, wherein the plurality of first exhaust grooves are distributed in the whole of the first die parting surface.

7. The mold of claim 1, wherein the plurality of second exhaust grooves are distributed in the whole of the second die parting surface.

8. The mold of claim 1, wherein the plurality of first exhaust grooves are parallel to each other.

9. The mold of claim 1, wherein the plurality of second exhaust grooves are parallel to each other.

10. The mold of claim 1, wherein the plurality of first exhaust grooves are parallel to each other, the plurality of second exhaust grooves are parallel to each other, and the extension direction of each second exhaust groove is perpendicular to the extension direction of each first exhaust groove.

11. A mold, comprising:
a first core comprising a first die parting surface defining a molding cavity; and
a second core matched with the first core and comprising a second die parting surface facing the first die parting surface of the first core;

wherein when the mold is closed, the first core and the second core cooperatively form at least one molding space, a plurality of first exhaust grooves are defined in the first die parting surface, a plurality of second exhaust grooves are defined in the second die parting surface, an extension direction of the second exhaust grooves intersects with an extension direction of the first exhaust grooves to form a plurality of gas vents communicating with each other when molding, a part of the gas vents are communicated with the at least one molding space, a depth across a cross-section of each first exhaust groove is in a range from about 1 micrometer to about 5 micrometers, a width across a base of the cross-section of each first exhaust groove is in a range from about 1 micrometer to about 5 micrometers, a depth across a cross-section of each second exhaust groove is in a range from about 1 micrometer to about 5 micrometers, and a width across a base of the cross section of each second exhaust groove is in a range from about 1 micrometer to about 5 micrometers.

12. The mold of claim 11, wherein the first exhaust grooves are machining marks formed during the machining of the first core.

13. The mold of claim 12, wherein the second exhaust grooves are machining marks formed during the machining of the second core.

14. The mold of claim 11, wherein the cross-section of each first exhaust groove is triangular.

15. The mold of claim 11, wherein the cross-section of each second exhaust groove is triangular.

16. The mold of claim 11, wherein the plurality of first exhaust grooves are distributed in the whole of the first die parting surface.

17. The mold of claim 11, wherein the plurality of second exhaust grooves are distributed in the whole of the second die parting surface.

18. The mold of claim 11, wherein the plurality of first exhaust grooves are parallel to each other.

19. The mold of claim 11, wherein the plurality of second exhaust grooves are parallel to each other.

20. The mold of claim 11, wherein the plurality of first exhaust grooves are parallel to each other, the plurality of second exhaust grooves are parallel to each other, and the extension direction of each second exhaust groove is perpendicular to the extension direction of each first exhaust groove.

* * * * *